United States Patent [19]

de Meulemeester

[11] 4,148,335

[45] Apr. 10, 1979

[54] RELIEF VALVE IMPROVEMENT

[75] Inventor: Jean-Claude de Meulemeester, Sens, France

[73] Assignee: FMC Corporation, San Jose, Calif.

[21] Appl. No.: 775,820

[22] Filed: Mar. 9, 1977

[30] Foreign Application Priority Data

Mar. 17, 1976 [FR] France .................. 76 07761

[51] Int. Cl.² ........................................... F16K 17/34
[52] U.S. Cl. ................... 137/484.8; 137/492; 137/526
[58] Field of Search ............... 137/484.2, 484.4, 484.6, 137/484.8, 526, 492

[56] References Cited

U.S. PATENT DOCUMENTS

| | | | |
|---|---|---|---|
| 2,308,583 | 1/1943 | Berges | 137/526 |
| 2,690,758 | 10/1954 | Lee | 137/484.8 X |
| 2,890,714 | 6/1959 | Greenwood | 137/484.2 |
| 3,592,224 | 7/1971 | Bois | 137/492 |

Primary Examiner—Harold W. Weakley
Attorney, Agent, or Firm—W. W. Ritt, Jr.; J. F. Verhoeven

[57] ABSTRACT

The purpose of the invention is to provide a pilot-valve-controlled safety valve for venting excess pressures without allowing any noxious gas to exhaust to atmosphere in the vicinity of personnel.

This purpose is achieved by the provision of a safety valve and pilot valve combination with a connection from the pilot valve to an exhaust duct of the main safety valve. Control of the exhaust rate from the pilot valve is effected by the provision of a divergent nozzle at the downstream end of the pipe leading from the pilot valve.

The invention is of particular value when applied to a storage vessel for natural gas or a natural gas pipeline.

1 Claim, 3 Drawing Figures

RELIEF VALVE IMPROVEMENT

The present invention concerns an improved pressure relief valve and in particular a pressure relief valve having a pressure pilot valve to actuate the relief valve under predetermined over-pressure conditions.

Such valves find application particularly in gas storage vessels or gas transporting vessels (e.g., for liquefied natural gas) where an increase in ambient temperature may result in an increase in the pressure within the vessel, and this pressure must be held within a certain range of values to avoid explosions of rupture.

The pressure relief valve in such a vessel is designed to regulate these pressures even to the extent of increasing the pressure in the event of a drop in ambient temperature.

In our French Pat. No. 1,597,979 (and corresponding U.S. Pat. No. 3,592,224) a pressure relief valve is described for use in relieving pressure in a pipeline, storage vessel or transporting vessel (for example for liquefied natural gas). In this pressure relief valve, the pressure of gas within a chamber of the pipeline or vessel is transmitted to a pressure pilot valve and the pilot valve responds to a pressure of the gas in excess of a predetermined value to operate the relief valve. In operating the relief valve, the gas delivered to the pilot valve is released to atmosphere in the vicinity of the pilot valve. However, it is a requirement in certain countries that the blow-off of gas shall take place only at a high location.

Accordingly, it is an object of the present invention to provide an improved pressure relief valve which meets the environmental regulations of certain countries. It is a further object to provide a pressure relief valve in which gas exhausted from the pressure pilot valve is led into the stream of gas exhausted from the relief valve without disrupting the operation of the pressure pilot valve.

The present invention provides a pressure relief valve comprising an inlet chamber, an exhaust chamber, a valve movable to open and close communication between the inlet chamber and the exhaust chamber, a pressure pilot valve having an inlet communicating with said inlet chamber, an outlet, and a pilot valve member biased by a spring toward a position in which it prevents flow from said inlet to said outlet, but movable in response to a predetermined difference in pressure between said inlet chamber and atmosphere to open and allow flow from said inlet to said outlet, and means responsive to opening of the pilot valve to permit the relief valve to open, characterized by a conduit connected between said outlet of the pilot valve and said exhaust chamber to lead fluid, exhausted from the inlet chamber via the pilot valve, into the exhaust chamber.

According to a preferred form of the invention, a divergent nozzle is provided at the downstream end of the conduit and diverging in the direction of fluid flow within the exhaust chamber, the conduit also having a check valve movable against the bias of a light spring to open communication between the conduit and atmosphere in response to the establishment of a predetermined sub-atmospheric pressure condition in the conduit.

One embodiment of the invention will now be described with reference to the accompanying drawings in which.

DESCRIPTION OF THE INVENTION

Figure 1:
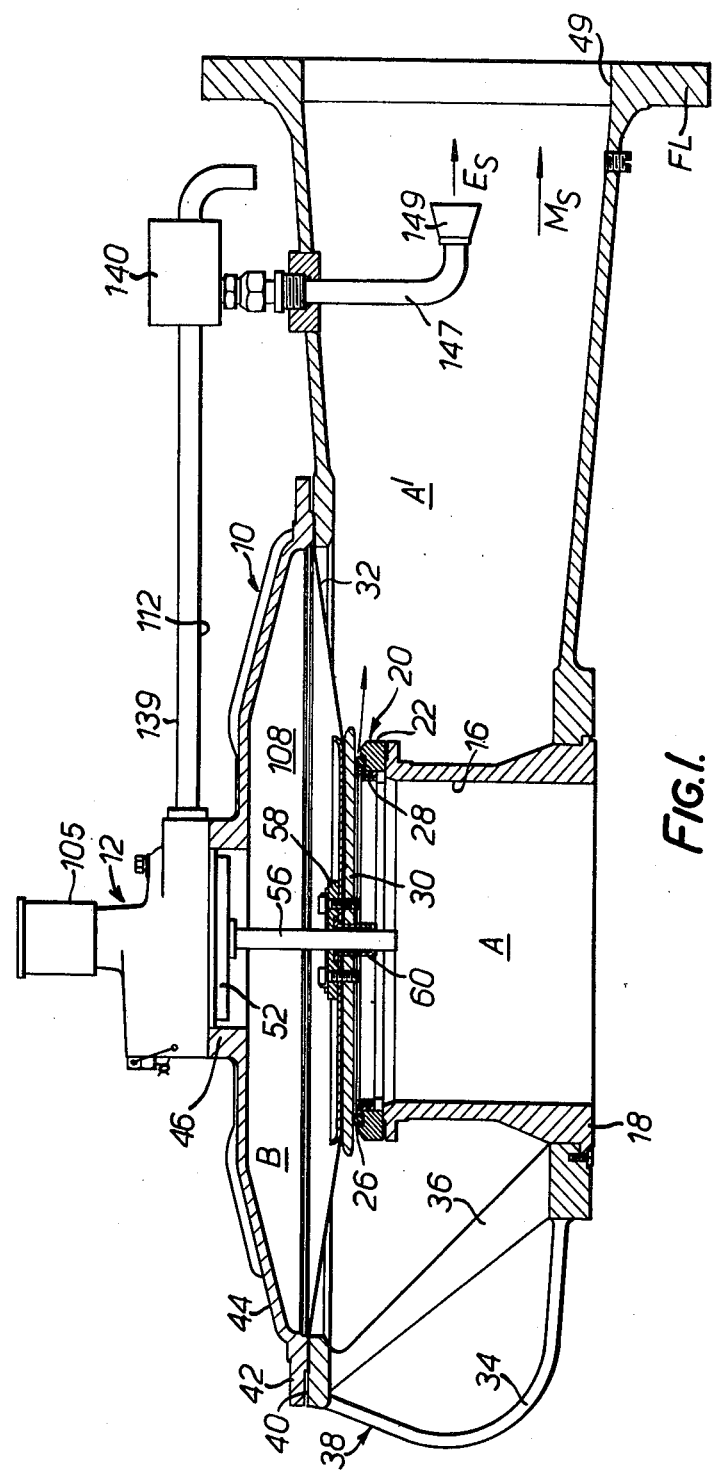
FIG. 1 is a section through a relief valve assembly including a pilot valve and exhaust control assembly.
Figure 2:
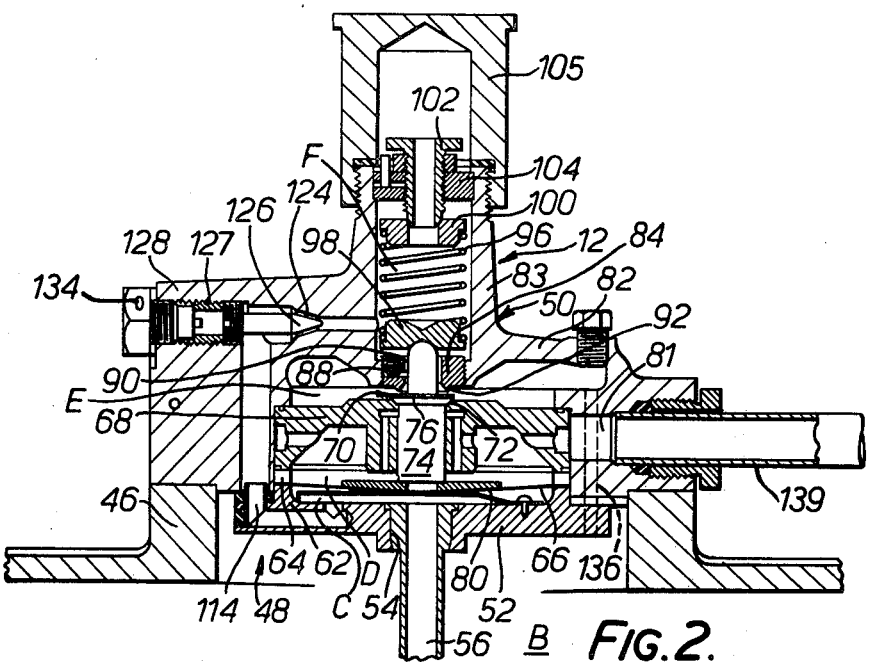
FIG. 2 is an enlarged sectional view of the relief valve assembly.
Figure 3:
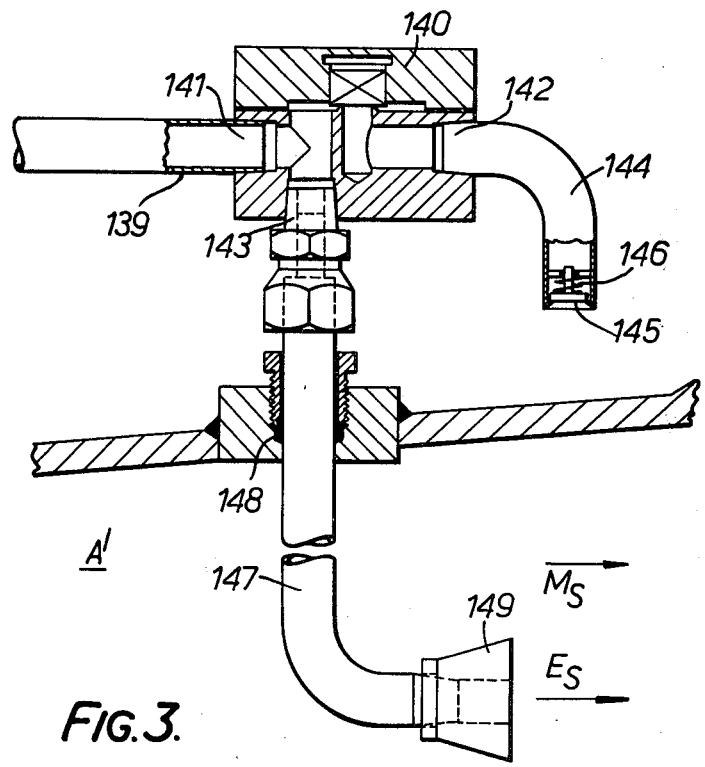
FIG. 3 is an enlarged sectional view of the exhaust control assembly of FIG. 1.

The relief valve system shown in FIGS. 1 to 3 comprises a diaphragm type relief valve 10, and a pilot valve 12. The relief valve 10, seen in FIG. 1, includes an inlet pipe section 16 with an integral flange 18 for attachment to a corresponding flange (not shown) forming part of a storage tank or product transport pipe (not shown). This inlet pipe section 16 is provided on its upper end with an anti-vibration seat assembly 20. The seat assembly basically consists of an annular body 22 retained on the pipe section 16, stationary O-ring seal 26, and an annular floating seal 28 mounted in the body for engagement with a valve plate 30 supported on a flexible diaphragm 32.

A curved outer wall 34 of generally toroidal shape and surrounding the inlet pipe 16, and having stiffening ribs 36, forms a body 38 of the relief valve 10. The upper part of the body 38 is open, and by means of a peripheral flange 40 cooperates with an opposing flange 42 of a rib bed cover plate 44 to retain the diaphragm 32 and seal the body of the relief valve. The cover plate 44 is secured to the body 38 in a conventional manner (not shown), such as by bolting or clamping. In the closed position (FIG. 1) the relief valve is divided into three chambers: (1) the inlet pipe 16 designated as chamber A, a lower chamber A' in the body 38, and an upper chamber B between the diaphragm 32 and the cover plate 44. The central part of the cover plate has a circular flange 46 (FIG. 2) with a central bore 48 on which flange the pilot valve 12 is mounted and sealed in a conventional manner. An exhaust port 49 in the curved outer wall 34 provides a means of discharging the released pressure to the outside atmosphere. Environmental regulations in some countries require the blow-off of gas to take place at a rather high elevation in order to prevent explosions and to prevent personnel from inhaling air containing a high percentage of natural gas. In ship-board installations in particular, the port 49 will be connected to a high stack to direct the exhaust gas up the stack and mix it with atmospheric air well above deck level.

The pilot valve has a body 50 that includes a bottom portion 52 having an aperture 54 therein. A guide tube 56, rigidly mounted in the aperture extends downwardly through a circular coupling plate 58 centrally positioned on the valve plate 30, and into the inlet pipe section 16. The guide tube is slidingly received in a bushing 60 that provides a pressure fluid-tight fit between the guide tube and plate 58.

PILOT VALVE

As best observed in FIG. 2, the body 50 of the pilot valve 12 is divided into four separate chambers indicated by letters C through F. Chambers C and D have annular sidewalls 62 and 64 respectively, and are separated by a flexible diaphragm 66. The chamber C is enclosed below by the bottom portion 52 of the valve body 50, and the chamber D is enclosed at its top by a plate 68 mounted on the wall 64. An opening 70 is centrally located in the plate 68, has a conical seat 72 formed therein. A valve stem 74, located in and extending through the opening 70, has a flange 76 formed thereon with a lower conical surface for engaging the seat 72 to close the valve. The valve stem 74 is attached to the flexible diaphragm 66 by means of a mounting disc 80, and thus is subject to vertical motion by the diaphragm 66 in response to any difference in pressure between chambers C and D. As seen in FIG. 2, chamber C also has an exhaust port 81 communicating with the exterior of the body 50.

Chamber E is located above chamber D, its bottom formed by the plate 68 and its top and sides constituted by inwardly-extending wall 82 of the body 50. An upward annular extension 83 of the wall 82 forms a chamber F that is separated from the chamber E by means of a threaded insert 84. In order to positively lock it into the wall 82, the insert is slotted and tapped to receive a lock screw 88. By tightening the lock screw the insert is slightly expanded at the slot, causing its thread to bind against the mating threads in the wall 82. The insert has a central aperture 90 and a downwardly-extending seat 92. The previously described valve stem 74 extends upwardly through the aperture 90, so that when the stem is in the raised position an upper surfave of the flange 76 engages the periphery of seat 92, closing off chamber F and opening the valve seat 72 between chambers D and E. It will also be apparent that the distance between the opposing seats 72 and 92 may be changed by varying the depth to which insert 84 is screwed into the thread in wall 82.

Located within chamber F is a spring 96 supported between a pair of bearing washers 98 and 100. The lower washer 98 bears against the upper portion of the valve stem 74, while the upper washer 100 is compressed toward the valve spring by a spring compression adjusting screw 102. The screw 102 is threaded into a disc 104 mounted in the upwardly extending sidewall 83 of the valve body 50. The screw 102 is covered by a cap 105 screwed to the outside of an upper terminal portion of sidewall 83.

Chambers C and F are interconnected by a generally C-shaped channel indicated at 114. An upper, horizontal, leg of channel 114 opens into chamber F, and contains a seat 124 for a tapered needle valve 126. The needle valve has a slotted head 127 received in a threaded cavity 128 of the valve body 50, so that its position with respect to the seat 124 can be adjusted. The end of the threaded cavity in which the needle valve 126 is received is closed by means of a capscrew 134. By adjusting the needle valve 126, the flow rate through channel 114, and hence between chambers C and F, can be governed to vary the closing rate of the pilot valve.

A second communicating channel is indicated in broken lines at 136 (FIG. 2). This channel interconnects chamber E of the pilot valve with chamber B of the relief valve.

Connected from the exhaust port 81 is a pipe 139 which leads to a first port 141 of a T-shaped pipe coupling 140, a second port 142 of the coupling leading to atmosphere via a stub pipe 144 having therein a check valve 145 biased towards its closed position by a return spring 146. The return spring 146 exerts a light force on the check valve sufficient normally to hold it closed but light enough to allow the check valve to open in the event of a sub-atmospheric pressure being set up in the stub pipe. The third port 143 is connected to one end of a pipe 147, the pipe 147 passing through a seal 148 in the wall of the body 38 adjacent the exhaust port 49 of the relief valve and terminating in a nozzle 149 divergent in a downwstream direction in chamber A' of the relief valve.

OPERATION

The relief valve in accordance with the present invention has three modes of operation. The first and second modes are involved when pressure is present in the storage vessel, the first mode retaining the pressure in the vessel, and the second mode releasing excess pressure when it exceeds the limit set by the pressure pilot valve 12. The third mode of operation is involved when a vacuum is present in the storage vessel, and the pilot valve functions to open the relief valve 10 thereby relieving the excess vacuum in the storage vessel and preventing implosion.

When the storage vessel is subjected to normal pressures within the range set for the valve unit, the normal pressure in the inlet pipe 16 at A is transmitted up the tube 56 into chamber C, then through channel 114 past the needle valve into the chamber F. The pressure in chamber C exerts an upward force on the diaphragm 66, chamber D being open to the exhaust. Since this force is not great enough to compress spring 96, the valve stem 74 remains in the lower position and chamber F is in communication with chamber E through the aperture 90. From chamber E the pressure is conducted into chamber B above the diaphragm 32 via channel 136 and consequently the pressure in chambers A and B is identical and the relief valve 12 remains closed, since the surface area above the diaphragm is greater than the surface area of the valve plate 30 subjected to the pressure in chamber A below the valve plate.

The second mode of operation of the relief valve is operative in response to an excess pressure condition in the storage vessel and inlet pipe 16 at A. The pressure from the chamber A is conducted upwardly into chamber C via the tube 56 and the pressure in chamber C is now sufficiently greater than the atmospheric pressure in chamber D so that the valve stem 74 is raised by the diaphragm 66 again, the spring 96 thereby opening valve seat 72 between chambers D and E. The upward motion of the valve stem closes aperture 90 between chambers E and F blocking pressure from chamber C passing through channel 114 into chamber F. By the opening of the aperture 70, chamber E is also open to the exhaust and the pressure in chamber B, above the diaphragm, escapes to the exhaust via channel 136, chamber E, chamber D, and the exhaust port 81. In response to the lowering of the pressure in chamber B, the diaphragm 32 and valve plate 30 rise, opening the relief valve and permitting the gas or liquid in the storage tank to escape into the relief valve body (chamber A') and to the atmosphere via discharge port 49 and possibly to a stack.

When the pressure in the storage tank and inlet pipe at A is dropped to a value below that determined by the spring 96, the valve stem lowers and the lower surface of the flange 76 engages the seat 72 thereby separating chambers D and E. The pressure from chamber C transmitted to chamber F via channel 114 and retained therein while the valve stem is in the raised position, is now released into chamber E from where it is conducted into chamber B by the channel 136. The relief valve is then closed by means of the static pressure in chamber B being greater then the pressures in chambers A and A'.

The value of excess pressure at which the relief valve that opens and closes is simply set or adjusted by means of an external adjustment. This adjustment is accomplished by removing the cover 105 thereby exposing or providing direct access to the ajusting screw 102. The pressure at which the pressure pilot is actuated opening and closing the relief valve in response thereto is determined by the compressive preload applied to the spring 96 by the screw 102.

In the third mode of operation, when the vessel and inlet pipe 16 are subjected to a vacuum of any degree, the vacuum is transmitted to chamber C then to chambers F and E via the channel 114. The chamber E is in direct communication with chamber B above the diaphragm 32 by means of the interior channel 136, and therefore any vacuum present at A is transmitted through the path previously described to chamber B above the diaphragm causing the diaphragm 32 to rise when any vacuum is present in the inlet pipe 16 and thus provide communication between chambers A and A'.

During the second mode of operation, gas is caused to flow out of the pilot valve via exhaust port 81, pipe 139 and pipe 147 to the divergent nozzle 149. The nozzle 149 serves to reduce the flow area in the exhaust port 49 and effects a local increase in the velocity to the main stream $M_s$. Pilot gas flow, indicated by arrow $E_s$, is entrained by the main stream, but since the velocity of the stream $E_s$ is somewhat less than that of stream $M_s$, the static pressure of the gas in the divergent nozzle 149 is less than that of the main stream. Accordingly, an aspirating effect is produced to draw gas from pipe 147 into the nozzle, and if the pressure in pipe 147 falls sufficiently to overcome the force of return spring 146, the check valve will open and allow air to be drawn from the atmosphere into the pipe coupling 140, and thence into pipe 147 through the stub pipe 144.

Although the best mode contemplated for carrying out the present invention has been herein shown and described, it will be apparent that modification and variation may be made without departing from what is regarded to be the subject matter of the invention as defined in the appended claims.

I claim:
1. In a pressure relief valve assembly having
   an inlet chamber,
   an exhaust chamber,
   a pressure responsive relief valve normally closing said inlet chamber and in response to relatively lower pressure on the side thereof outwardly of said inlet chamber movable to open communication between the inlet chamber and the exhaust chamber,
   a pressure pilot valve unit having an inlet communicating with said inlet chamber, an outlet, and a pilot valve member biased by a spring toward a position in which it prevents flow from said inlet to said outlet, and in response to a predetermined pressure in said inlet chamber, said spring moves to open and allow flow from said inlet to said outlet, and,
   means responsive to the opening of the pilot valve member to permit the relief valve to open,
   the improvement comprising:
   an external conduit connected between said outlet of the pilot valve unit and said exhaust chamber to lead fluid, exhausted from the inlet chamber via the pilot valve unit, to said exhaust chamber, said inlet communicating with said pressure responsive valve on said one side thereof outwardly of said inlet chamber when said pilot valve is closed,
   nozzle means connected to the conduit and extending into the exhaust chamber for aspirating fluid from the conduit into said exhaust chamber, and,
   a port in said conduit externally of said exhaust chamber and controlled by a check valve movable against the bias of a light spring to open communication between the conduit and the atmosphere in response to the occurrence of a predetermined reduced pressure condition in the aspirating nozzle.

* * * * *